United States Patent
Choi et al.

(10) Patent No.: US 8,861,618 B2
(45) Date of Patent: Oct. 14, 2014

(54) DEBLOCKING FILTER AND DISPLAY DEVICE HAVING THE SAME

(75) Inventors: Woo-Young Choi, Seoul (KR); Kyoung-Mook Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 614 days.

(21) Appl. No.: 13/228,009

(22) Filed: Sep. 8, 2011

(65) Prior Publication Data

US 2012/0057077 A1    Mar. 8, 2012

(30) Foreign Application Priority Data

Sep. 8, 2010  (KR) ........................ 10-2010-0087876

(51) Int. Cl.

| | |
|---|---|
| *H04N 19/00* | (2014.01) |
| *H04N 19/42* | (2014.01) |
| *H04N 19/86* | (2014.01) |
| *H04N 19/117* | (2014.01) |
| *H04N 19/14* | (2014.01) |
| *H04N 19/132* | (2014.01) |
| *H04N 19/186* | (2014.01) |
| *H04N 5/213* | (2006.01) |
| *H04N 19/184* | (2014.01) |

(52) U.S. Cl.
CPC ......... *H04N 5/213* (2013.01); *H04N 19/00478* (2013.01); *H04N 19/00909* (2013.01); *H04N 19/00066* (2013.01); *H04N 19/00157* (2013.01); *H04N 19/00127* (2013.01); *H04N 19/00315* (2013.01); *H04N 19/00309* (2013.01)
USPC ............... 375/240.29; 375/240.24; 348/420.1

(58) Field of Classification Search
USPC .................... 375/240.24, 240.29; 348/420.1
See application file for complete search history.

(56) References Cited

U.S. PATENT DOCUMENTS

2009/0003441 A1 *  1/2009  Sekiguchi et al. ........ 375/240.13
2010/0260260 A1 * 10/2010  Wiegand et al. ......... 375/240.12

FOREIGN PATENT DOCUMENTS

| | | |
|---|---|---|
| JP | 2006-197186 A | 7/2006 |
| JP | 2008-123349 A | 5/2008 |
| KR | 10-2009-0078494 A | 7/2009 |

* cited by examiner

*Primary Examiner* — Sath V Perungavoor
*Assistant Examiner* — Jeffery Williams
(74) *Attorney, Agent, or Firm* — Sughrue Mion, PLLC

(57) ABSTRACT

A deblocking filter includes a color resolution expansion unit, an edge filtering unit and a color resolution contraction unit. The color resolution expansion unit increases a color resolution of input video data to generate first video data. The edge filtering unit performs a blurring operation on a block edge of the first video data based on block size information to generate second video data. The color resolution contraction unit reduces a color resolution of the second video data to generate output video data, a color resolution of the output video data being the same as the color resolution of the input video data.

20 Claims, 8 Drawing Sheets

DEBLOCKING FILTER AND DISPLAY DEVICE HAVING THE SAME

CROSS-REFERENCE TO RELATED APPLICATION

This application claims priority from Korean Patent Application No. 10-2010-0087876, filed on Sep. 8, 2010 in the Korean Intellectual Property Office, the contents of which are incorporated herein by reference in their entirety.

BACKGROUND

1. Technical Field

Exemplary embodiments relate to a display device, and more particularly, to a deblocking filter and a display device including the deblocking filter.

2. Description of the Related Art

Many video processing systems use standardized video codecs, such as H.261, H.262 and H.263 recommended by the International Telecommunication Union (ITU) or Moving Picture Experts Group (MPEG)-1, MPEG-2 and MPEG-4 recommended by the MPEG Recently, the H.264/AVC, which is standardized by Joint Video Team (JVT), is widely used.

In the standardized video codecs, an image is compressed in block units and then decoded. Because most compression techniques perform discrete cosine transform (DCT) on block units of a predetermined size and then quantization on the DCT transformed block units, block units are separately transformed and quantized without consideration of correlations between their neighboring block units. As a result, a blocking artifact, which is a discontinuity of pixel data on a block edge, and a color banding, which is an abrupt change of color shades, may occur in a decoded image.

SUMMARY

One or more exemplary embodiments provide a deblocking filter that is able to efficiently reduce a blocking artifact and a color banding in a video data.

One or more embodiments also provide a display device including the deblocking filter.

According to an aspect of an exemplary embodiment, there is I provided a deblocking filter including a color resolution expansion unit, an edge filtering unit and a color resolution contraction unit. The color resolution expansion unit increases a color resolution of input video data to generate first video data. The edge filtering unit performs a blurring operation on a block edge of the first video data based on block size information to generate second video data. The color resolution contraction unit reduces a color resolution of the second video data to generate output video data, where a color resolution of the output video data is the same as the color resolution of the input video data.

The color resolution expansion unit may include a shift register unit that performs a left shift operation on the input video data.

The color resolution expansion unit may include a multiplication unit that multiplies $2^n$ to the input video data, where n is a positive integer.

The color resolution contraction unit may include a shift register unit that performs a right shift operation on the second video data.

The color resolution contraction unit may include a division unit that divides the second video data by $2^n$, where n is a positive integer.

The color resolution contraction unit may include a dithering unit that performs a dithering operation on the second video data.

The input video data may include a Y signal, a U signal and a V signal, where the Y signal represents a luminance of the input video data, the U signal and the V signal represent a chrominance of the input video data, and each of color resolutions of the Y signal, the U signal and the V signal is m bits. The color resolution expansion unit may increase each of the color resolutions of the Y signal, the U signal and the V signal to (m+n) bits to generate a Y1 signal, a U1 signal and a V1 signal, respectively, where the first video data includes the Y1 signal, the U1 signal and the V1 signal, and n and m are positive integers.

The color resolution expansion unit may include a first shift register configured to shift the Y signal to the left by n bits to generate the Y1 signal, a second shift register configured to shift the U signal to the left by n bits to generate the U1 signal, and a third shift register configured to shift the V signal to the left by n bits to generate the V1 signal.

The color resolution expansion unit may include a first multiplier configured to multiply $2^n$ to the Y signal to generate the Y1 signal, a second multiplier configured to multiply $2^n$ to the U signal to generate the U1 signal, and a third multiplier configured to multiply $2^n$ to the V signal to generate the V1 signal.

The edge filtering unit may perform a blurring operation on block edges of the Y1 signal, the U1 signal and the V1 signal to generate a Y2 signal, a U2 signal and a V2 signal, respectively, where the second video data includes the Y2 signal, the U2 signal and the V2 signal.

The color resolution contraction unit may reduce each of color resolutions of the Y2 signal, the U2 signal and the V2 signal to m bits to generate a Y3 signal, a U3 signal and a V3 signal, respectively, where the output video data includes the Y3 signal, the U3 signal and the V3 signal.

The color resolution contraction unit may include a first shift register configured to shift the Y2 signal to the right by n bits to generate the Y3 signal, a second shift register configured to shift the U2 signal to the right by n bits to generate the U3 signal, and a third shift register configured to shift the V2 signal to the right by n bits to generate the V3 signal.

The color resolution contraction unit may include a first divider configured to divide the Y2 signal by $2^n$ to generate the Y3 signal, a second divider configured to divide the U2 signal by $2^n$ to generate the U3 signal, and a third divider configured to divide the V2 signal by $2^n$ to generate the V3 signal.

The color resolution contraction unit may include a first dithering unit configured to perform a dithering operation on the Y2 signal to generate the Y3 signal, a second dithering unit configured to perform a dithering operation on the U2 signal to generate the U3 signal, a third dithering unit configured to perform a dithering operation on the V2 signal to generate the V3 signal.

According to an aspect of another exemplary embodiment, there is provided a display device including a video decoding unit, a deblocking filter and a display unit. The video decoding unit decodes a compressed video data to generate input video data and outputs block size information, where the block size information represents a size of a block unit of the compressed video data. The deblocking filter filters the input video data based on the block size information to generate output video data. The display unit displays the output video data. The deblocking filter includes a color resolution expansion unit configured to increase a color resolution of the input video data to generate a first video data, an edge filtering unit configured to perform a blurring operation on a block edge of the first video data based on the block size information to generate second video data, and a color resolution contraction unit configured to reduce a color resolution of the second video data to generate the output video data, where a color resolution of the output video data is the same as the color resolution of the input video data.

BRIEF DESCRIPTION OF THE DRAWINGS

Illustrative, non-limiting exemplary embodiments will be more clearly understood from the following detailed description in conjunction with the accompanying drawings in which.

DETAILED DESCRIPTION OF EXEMPLARY EMBODIMENTS

Figure 1:
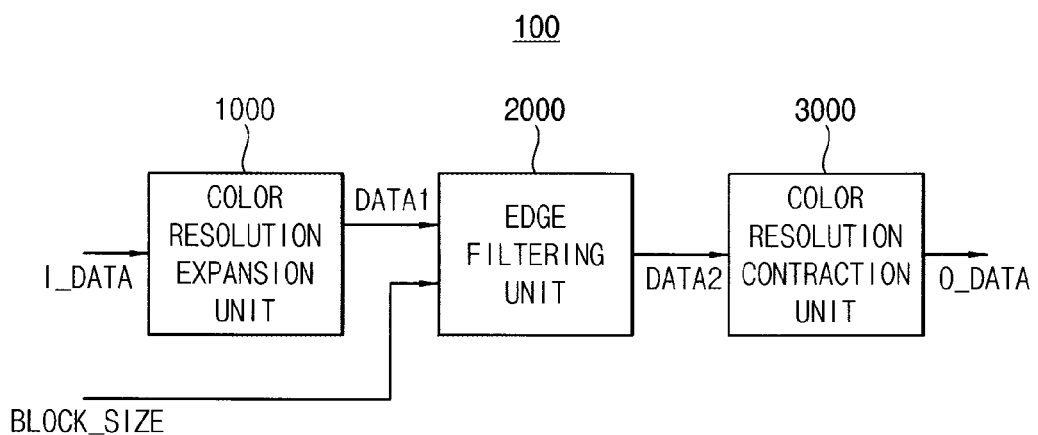
FIG. 1 is a block diagram illustrating a deblocking filter according to an exemplary embodiment.

Various exemplary embodiments will be described more fully with reference to the accompanying drawings. The present inventive concept may, however, be embodied in many different forms and should not be construed as limited to the exemplary embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. The term "unit" as used herein means a hardware component and/or a software component that is executed by a hardware component such as a processor.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a deblocking filter according to an exemplary embodiment.

Referring to FIG. 1, a deblocking filter 100 includes a color resolution expansion unit 1000, an edge filtering unit 2000 and a color resolution contraction unit 3000.

The color resolution expansion unit 1000 receives input video data I_DATA from an external source and increases a color resolution of the input video data I_DATA to generate first video data DATA1. The input video data I_DATA may be data that is generated by decoding a compressed video data, which is compressed by standardized video codecs, such as H.264/AVC, MPEG-4, etc.

The edge filtering unit 2000 receives block size information BLOCK_SIZE from an external source. According to standardized video codecs, such as H.264/AVC, MPEG-4, etc., video data is compressed in block units. The block size information BLOCK_SIZE represents a size of a block unit of the compressed video data. In some exemplary embodiments, the block size information BLOCK_SIZE may be 4×4. In another exemplary embodiment, the block size information BLOCK_SIZE may be 8×8.

The edge filtering unit 2000 performs a blurring operation on a block edge of the first video data DATA1 based on the block size information BLOCK_SIZE to generate second video data DATA2. A color resolution of the second video data DATA2 may be the same as the color resolution of the first video data DATA1.

In the standardized video codecs, such as H.264/AVC, MPEG-4, etc., video data is compressed in block units and then decoded, which may result in a blocking artifact and a color banding in a decoded video data. The edge filtering unit 2000 may perform a blurring operation on the block edge of the first video data DATA1 to smooth out an abrupt change of pixel data in an area adjacent to the block edge. The edge filtering unit 2000 may be embodied using various algorithms.

The color resolution contraction unit 3000 reduces a color resolution of the second video data DATA2 to the color resolution of the input video data I_DATA to generate output video data O_DATA. Therefore, a color resolution of the output video data O_DATA is the same as the color resolution of the input video data I_DATA.

In an exemplary embodiment, the input video data I_DATA may include a Y signal, a U signal and a V signal. The Y signal may represent a luminance of the input video data I_DATA. The U signal and the V signal may represent a chrominance of the input video data I_DATA. Each of color resolutions of the Y signal, the U signal and the V signal may be m bits, where m is a positive integer. That is, each of the Y signal, the U signal and the V signal may have a value ranging from zero to $2^m-1$. In an exemplary embodiment, each of the color resolutions of the Y signal, the U signal and the V signal may be 8 bits.

The color resolution expansion unit 1000 may increase each of the color resolutions of the Y signal, the U signal and the V signal to (m+n) bits to generate a Y1 signal, a U1 signal and a V1 signal, respectively, where n is a positive integer. The color resolution expansion unit 1000 may output the first video data DATA1 including the Y1 signal, the U1 signal and the V1 signal. In an exemplary embodiment, the color resolution expansion unit 1000 may increase each of the color resolutions of the Y signal, the U signal and the V signal by 2 bits. For example, when each of the color resolutions of the Y signal, the U signal and the V signal is 8 bits, each of color resolutions of the Y1 signal, the U1 signal and the V1 signal may be 10 bits.

The edge filtering unit 2000 may perform a blurring operation on block edges of the Y1 signal, the U1 signal and the V1 signal to generate a Y2 signal, a U2 signal and a V2 signal, respectively. The edge filtering unit 2000 may output the second video data DATA2 including the Y2 signal, the U2 signal and the V2 signal. Since the edge filtering unit 2000 does not change color resolutions of the Y1 signal, the U1 signal and the V1 signal, each of color resolutions of the Y2 signal, the U2 signal and the V2 signal may be the same as the color resolutions of the Y1 signal, the U1 signal and the V1 signal. For example, when each of the color resolutions of the Y1 signal, the U1 signal and the V1 signal is 10 bits, each of the color resolutions of the Y2 signal, the U2 signal and the V2 signal may be 10 bits.

The color resolution contraction unit 3000 may reduce each of the color resolutions of the Y2 signal, the U2 signal and the V2 signal to m bits to generate a Y3 signal, a U3 signal and a V3 signal, respectively. The color resolution contraction unit 3000 may output the output video data O_DATA including the Y3 signal, the U3 signal and the V3 signal. In an exemplary embodiment, the color resolution contraction unit 3000 may reduce each of the color resolutions of the Y2 signal, the U2 signal and the V2 signal by 2 bits. For example, when each of the color resolutions of the Y2 signal, the U2 signal and the V2 signal is 10 bit, each of color resolutions of the Y3 signal, the U3 signal and the V3 signal may be 8 bits.

Related art deblocking filters perform deblocking algorithms on a video data without increasing a color resolution of the video data.

On the other hand, in the deblocking filter 100 according to exemplary embodiments, after the color resolution expansion unit 1000 increases the color resolution of the input video data I_DATA to generate the first video data DATA1, the edge filtering unit 2000 performs a blurring operation on the block edge of the first video data DATA1, which has an increased color resolution, so that the edge filtering unit 2000 may smooth out an abrupt change of pixel data more naturally. Therefore, the deblocking filter 100 may efficiently reduce a blocking artifact and a color banding in the input video data I_DATA.

Figure 2:
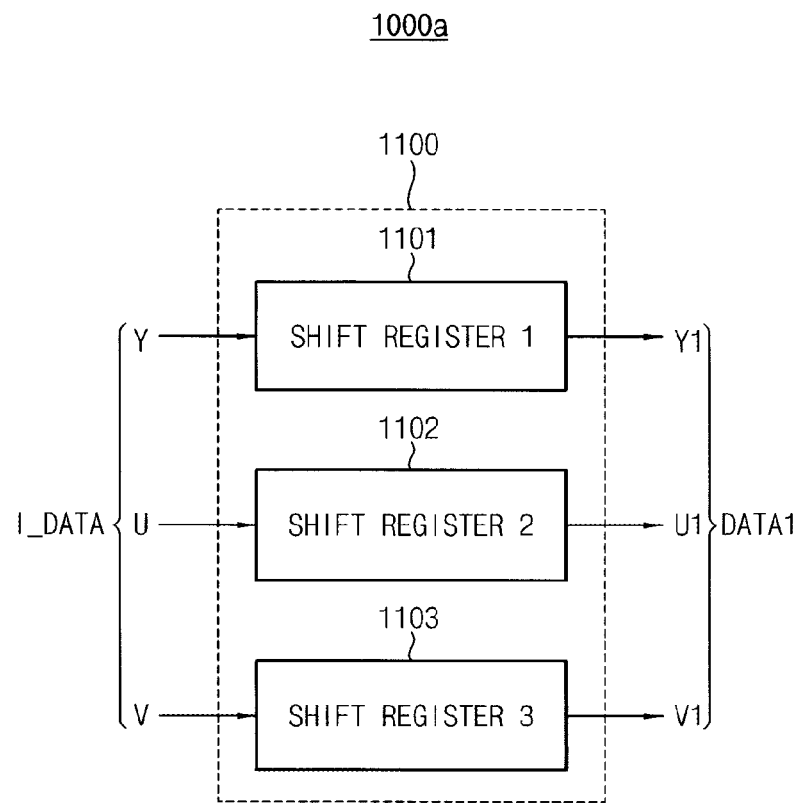
FIG. 2 is a block diagram illustrating a color resolution expansion unit included in a deblocking filter of FIG. 1 according to an exemplary embodiment.

FIG. 2 is a block diagram illustrating a color resolution expansion unit included in a deblocking filter of FIG. 1 according to an exemplary embodiment.

Referring to FIG. 2, a color resolution expansion unit 1000a may include a first shift register unit 1100 that performs a left shift operation on the input video data I_DATA. The first shift register unit 1100 may increase the color resolution of the input video data I_DATA by n bits by shifting the input video data I_DATA to the left by n bits to generate the first video data DATA1.

The first shift register unit 1100 may include a first shift register 1101, a second shift register 1102 and a third shift register 1103. The first shift register 1101 may shift the Y signal, which is included in the input video data I_DATA, to the left by n bits to generate the Y1 signal. The second shift register 1102 may shift the U signal, which is included in the input video data I_DATA, to the left by n bits to generate the U1 signal. The third shift register 1103 may shift the V signal, which is included in the input video data I_DATA, to the left by n bits to generate the V1 signal.

Therefore, the color resolution expansion unit 1000a may increase each of the color resolutions of the Y signal, the U signal and the V signal, which are included in the input video data I_DATA, by n bits to generate the Y1 signal, the U1 signal and the V1 signal, respectively. The color resolution expansion unit 1000a may output the first video data DATA1 that includes the Y1 signal, the U1 signal and the V1 signal.

In an exemplary embodiment, the first shift register 1101, the second shift register 1102 and the third shift register 1103 may set 0 as a least significant bit (LSB) while performing a left shift operation on the Y signal, the U signal and the V signal, respectively.

In another exemplary embodiment, the first shift register 1101, the second shift register 1102 and the third shift register 1103 may set 1 as a LSB while performing a left shift operation on the Y signal, the U signal and the V signal, respectively.

In still another exemplary embodiment, the first shift register 1101, the second shift register 1102 and the third shift register 1103 may set a value, which is randomly selected between 0 and 1, as a LSB while performing a left shift operation on the Y signal, the U signal and the V signal, respectively.

Figure 3:
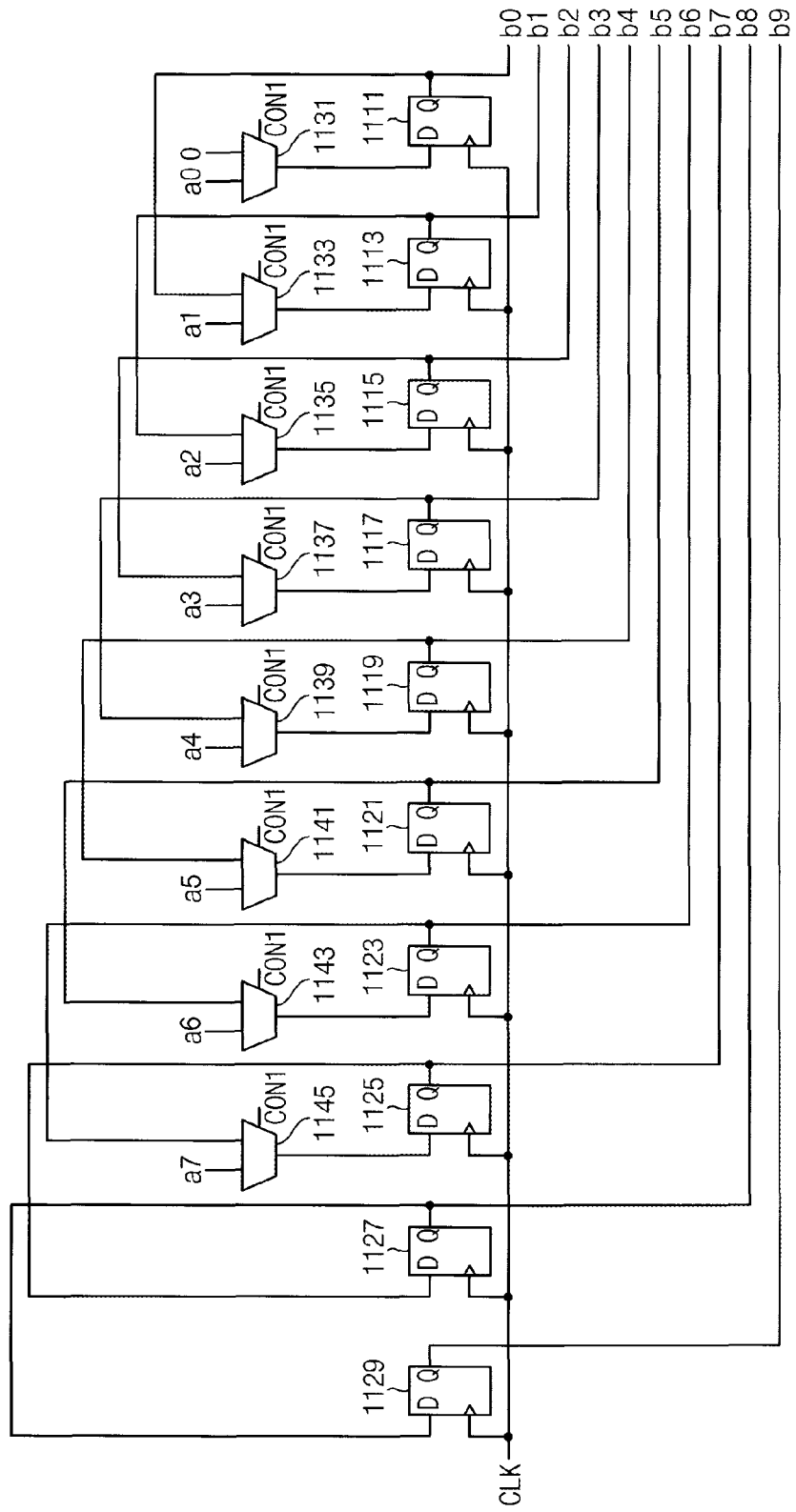
FIG. 3 is a circuit illustrating a first shift register included in a color resolution expansion unit of FIG. 2 according to an exemplary embodiment.

FIG. 3 is a circuit illustrating a first shift register included in a color resolution expansion unit of FIG. 2 according to an exemplary embodiment.

In FIG. 3, a first shift register 1101a, which receives the Y signal having a color resolution of 8 bits and shifts the Y signal to the left by 2 bits to generate the Y1 signal having a color resolution of 10 bits, is illustrated as an example.

In FIG. 3, a7, a6, a5, a4, a3, a2, a1, a0 represents the Y signal having a color resolution of 8 bits and b9, b8, b7, b6, b5, b4, b3, b2, b1, b0 represents the Y1 signal having a color resolution of 10 bits. A LSB of the Y signal is a0 and a most significant bit (MSB) of the Y signal is a7. A LSB of the Y1 signal is b0 and a MSB of the Y1 signal is b9.

Referring to FIG. 3, the first shift register 1101a may include a first flip-flop 1111, a second flip-flop 1113, a third flip-flop 1115, a fourth flip-flop 1117, a fifth flip-flop 1119, a sixth flip-flop 1121, a seventh flip-flop 1123, an eighth flip-flop 1125, a ninth flip-flop 1127, a tenth flip-flop 1129, a first multiplexer 1131, a second multiplexer 1133, a third multiplexer 1135, a fourth multiplexer 1137, a fifth multiplexer 1139, a sixth multiplexer 1141, a seventh multiplexer 1143 and an eighth multiplexer 1145.

Each of the first to the tenth flip-flops 1111, 1113, 1115, 1117, 1119, 1121, 1123, 1125, 1127, 1129 may operate in synchronization with a clock signal CLK received from an external source. Each of the first to the eighth multiplexers 1131, 1133, 1135, 1137, 1139, 1141, 1143, 1145 may output one of a signal received at a first input electrode and a signal received at a second input electrode in response to a first control signal CON1. For example, each of the first to the eighth multiplexers 1131, 1133, 1135, 1137, 1139, 1141, 1143, 1145 may output a signal received at the first input electrode when the first control signal CON1 has a first value, and output a signal received at the second input electrode when the first control signal CON1 has a second value.

As illustrated in FIG. 3, bits of the Y signal, that is, a0, a1, a2, a3, a4, a5, a6 and a7 may be input to the first input electrodes of the first to the eighth multiplexers 1131, 1133, 1135, 1137, 1139, 1141, 1143, 1145, respectively. The second input electrode of the first multiplexer 1131 may receive 0. An output electrode Q of the first flip-flop 1111 may be connected to the second input electrode of the second multiplexer 1133. An output electrode Q of the second flip-flop 1113 may be connected to the second input electrode of the third multiplexer 1135. An output electrode Q of the third flip-flop 1115 may be connected to the second input electrode of the fourth multiplexer 1137. An output electrode Q of the fourth flip-flop 1117 may be connected to the second input electrode of the fifth multiplexer 1139. An output electrode Q of the fifth flip-flop 1119 may be connected to the second input electrode of the sixth multiplexer 1141. An output electrode Q of the sixth flip-flop 1121 may be connected to the second input electrode of the seventh multiplexer 1143. An output electrode Q of the seventh flip-flop 1123 may be connected to the second input electrode of the eighth multiplexer 1145.

An output electrode of the first multiplexer 1131 may be connected to an input electrode D of the first flip-flop 1111. An output electrode of the second multiplexer 1133 may be connected to an input electrode D of the second flip-flop 1113. An output electrode of the third multiplexer 1135 may be connected to an input electrode D of the third flip-flop 1115. An output electrode of the fourth multiplexer 1137 may be connected to an input electrode D of the fourth flip-flop 1117. An output electrode of the fifth multiplexer 1139 may be connected to an input electrode D of the fifth flip-flop 1119. An output electrode of the sixth multiplexer 1141 may be connected to an input electrode D of the sixth flip-flop 1121. An output electrode of the seventh multiplexer 1143 may be connected to an input electrode D of the seventh flip-flop 1123. An output electrode of the eighth multiplexer 1145 may be connected to an input electrode D of the eighth flip-flop 1125.

An output electrode Q of the eighth flip-flop 1125 may be connected to an input electrode D of the ninth flip-flop 1127. An output electrode Q of the ninth flip-flop 1127 may be connected to an input electrode D of the tenth flip-flop 1129.

Output signals output from the output electrodes Q of the first to the tenth flip-flops 1111, 1113, 1115, 1117, 1119, 1121, 1123, 1125, 1127, 1129 may be bits of the Y1 signal, that is, b0, b1, b2, b3, b4, b5, b6, b7, b8 and b9, respectively.

Hereinafter, an operation of the first shift register 1101a will be described.

Bits of the Y signal, that is, a0, a1, a2, a3, a4, a5, a6 and a7 may be input to the first input electrodes of the first to the eighth multiplexers 1131, 1133, 1135, 1137, 1139, 1141, 1143, 1145, respectively, while the first control signal CON1 has the first value. Therefore, the first to the eighth multiplexers 1131, 1133, 1135, 1137, 1139, 1141, 1143, 1145 may provide a0, a1, a2, a3, a4, a5, a6 and a7, to the input electrodes D of the first to the eighth flip-flops 1111, 1113, 1115, 1117, 1119, 1121, 1123, 1125, respectively.

After that, the first to the eighth flip-flops 1111, 1113, 1115, 1117, 1119, 1121, 1123, 1125 may output a0, a1, a2, a3, a4, a5, a6 and a7, respectively, in synchronization with the clock signal CLK. Therefore, a0, a1, a2, a3, a4, a5 and a6 may be input to the second input electrodes of the second to the eighth multiplexers 1133, 1135, 1137, 1139, 1141, 1143, 1145, respectively, and a7 may be input to the input electrode D of the ninth flip-flop 1127.

After that, the first control signal CON1 may transit to the second value. Therefore, the first multiplexer 1131 may output 0, which is input to the second input electrode, and the second to the eighth multiplexers 1133, 1135, 1137, 1139, 1141, 1143, 1145 may output a0, a1, a2, a3, a4, a5 and a6, respectively, which is received by the second input electrode from the output electrodes Q of the first to seventh multiplexers 1111 to 1123.

The first shift register 1101a may operate as described above at every cycle of the clock signal CLK. Therefore, after two more cycles of the clock signal CLK, the first flip-flop 1111 and the second flip-flop 1113 may output 0, and the third to the tenth flip-flops 1115, 1117, 1119, 1121, 1123, 1125, 1127, 1129 may output a0, a1, a2, a3, a4, a5, a6 and a7, respectively. The output signals of the first to the tenth flip-flop 1111, 1113, 1115, 1117, 1119, 1121, 1123, 1125, 1127, 1129 at this time may be bits of the Y1 signal, that is, b0, b1, b2, b3, b4, b5, b6, b7, b8 and b9, respectively.

As described above, the first shift register 1101a of FIG. 3 sets 0 as a LSB while performing a left shift operation. Therefore, the first shift register 1101a may shift the Y signal, which has the color resolution of 8 bits, to the left by 2 bits and set 0 as the rightmost two bits to generate the Y1 signal, which has the color resolution of 10 bits.

In other exemplary embodiments, the second input electrode of the first multiplexer 1131 may receive 1. Therefore, the first shift register 1101a may set 1 as a LSB while performing a left shift operation.

The second shift register 1102 and the third shift register 1103 included in the first shift register unit 1100 of FIG. 2 may have the same structure as the first shift register 1101a of FIG. 3. Therefore, a detail description of the second shift register 1102 and the third shift register 1103 will be omitted.

Figure 4:
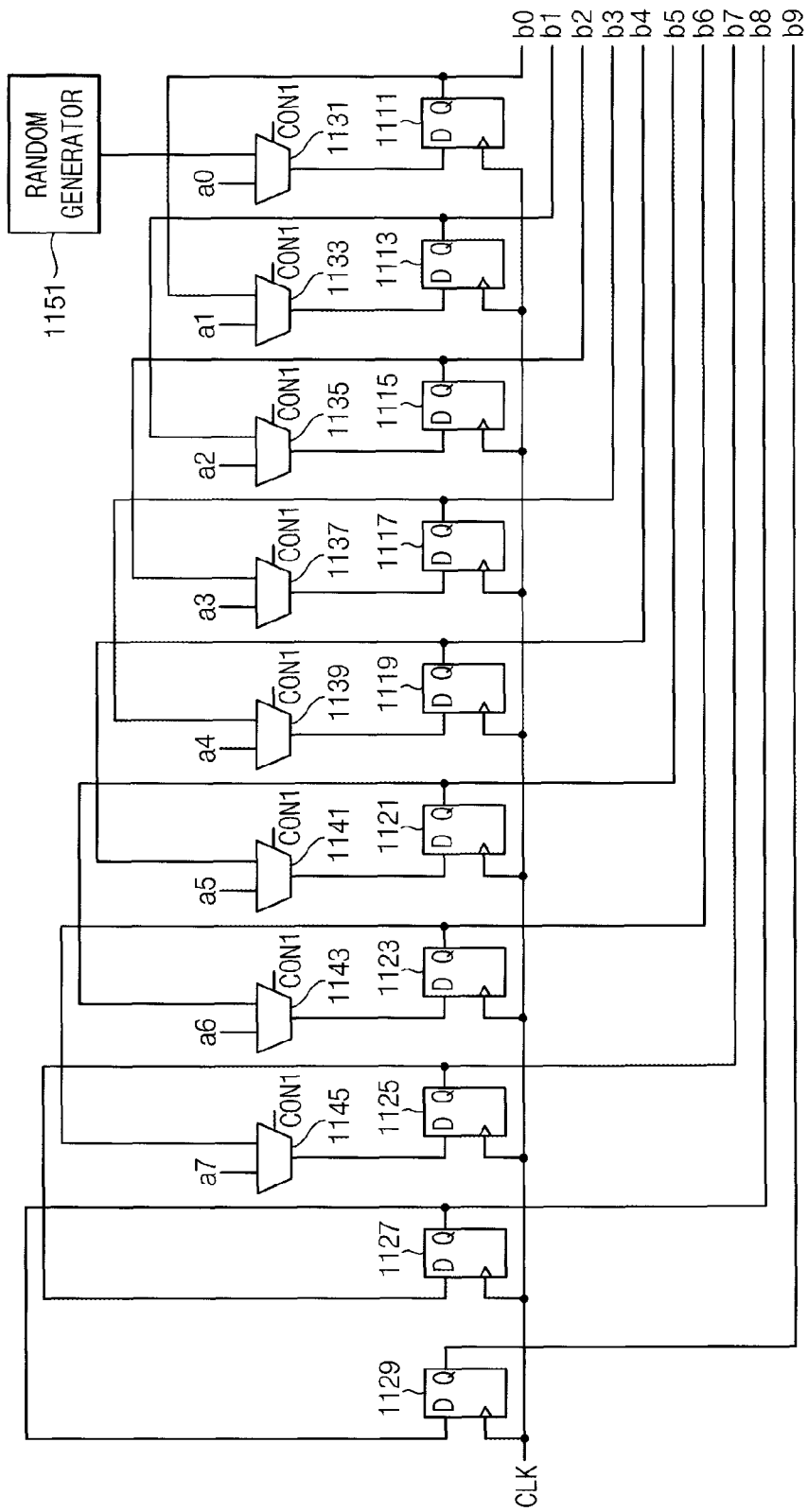
FIG. 4 is a circuit illustrating a first shift register included in a color resolution expansion unit of FIG. 2 according to another exemplary embodiment.

FIG. 4 is a circuit illustrating a first shift register included in a color resolution expansion unit of FIG. 2 according to another exemplary embodiment.

Referring to FIG. 4, a first shift register 1101b has the same structure as the first shift register 1101a of FIG. 3 except that the first shift register 1101b further includes a random generator 1151. Therefore, a detail description of the first shift register 1101b except for the random generator 1151 will be omitted.

The random generator 1151 may output a value that is randomly selected between 0 and 1. As described in FIG. 4, since an output signal of the random generator 1151 is input to the second input electrode of the first multiplexer 1131, the first shift register 1101b may set a value, which is randomly selected between 0 and 1, as a LSB while performing a left shift operation. Therefore, the first shift register 1101b may shift the Y signal, which has the color resolution of 8 bits, to the left by 2 bits and set a value, which is randomly selected between 0 and 1, as the rightmost two bits to generate the Y1 signal, which has the color resolution of 10 bits.

The second shift register 1102 and the third shift register 1103 included in the first shift register unit 1100 of FIG. 2 may have the same structure as the first shift register 1101b of FIG. 4. Therefore, a detail description of the second shift register 1102 and the third shift register 1103 will be omitted.

Figure 5:
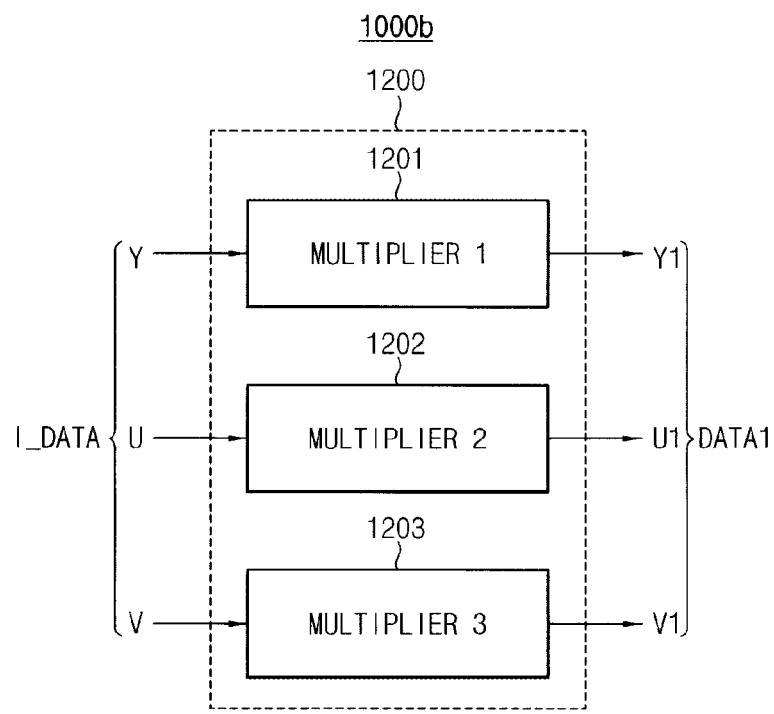
FIG. 5 is a block diagram illustrating a color resolution expansion unit included in a deblocking filter of FIG. 1 according to another exemplary embodiment.

FIG. 5 is a block diagram illustrating a color resolution expansion unit included in a deblocking filter of FIG. 1 according to another exemplary embodiment.

Referring to FIG. 5, a color resolution expansion unit 1000b may include a multiplication unit 1200 that multiplies 2^n to the input video data I_DATA. The multiplication unit 1200 may increase the color resolution of the input video data I_DATA by n bits by multiplying 2^n to the input video data I_DATA to generate the first video data DATA1.

The multiplication unit 1200 may include a first multiplier 1201, a second multiplier 1202 and a third multiplier 1203. The first multiplier 1201 may multiply 2^n to the Y signal, which is included in the input video data I_DATA, to generate the Y1 signal. The second multiplier 1202 may multiply 2^n to the U signal, which is included in the input video data I_DATA, to generate the U1 signal. The third multiplier 1203 may multiply 2^n to the V signal, which is included in the input video data I_DATA, to generate the V1 signal.

Therefore, the color resolution expansion unit 1000b may increase each of the color resolutions of the Y signal, the U signal and the V signal, which are included in the input video data I_DATA, by n bits to generate the Y1 signal, the U1 signal and the V1 signal, respectively. The color resolution expansion unit 1000b may output the first video data DATA1 that includes the Y1 signal, the U1 signal and the V1 signal.

Figure 6:
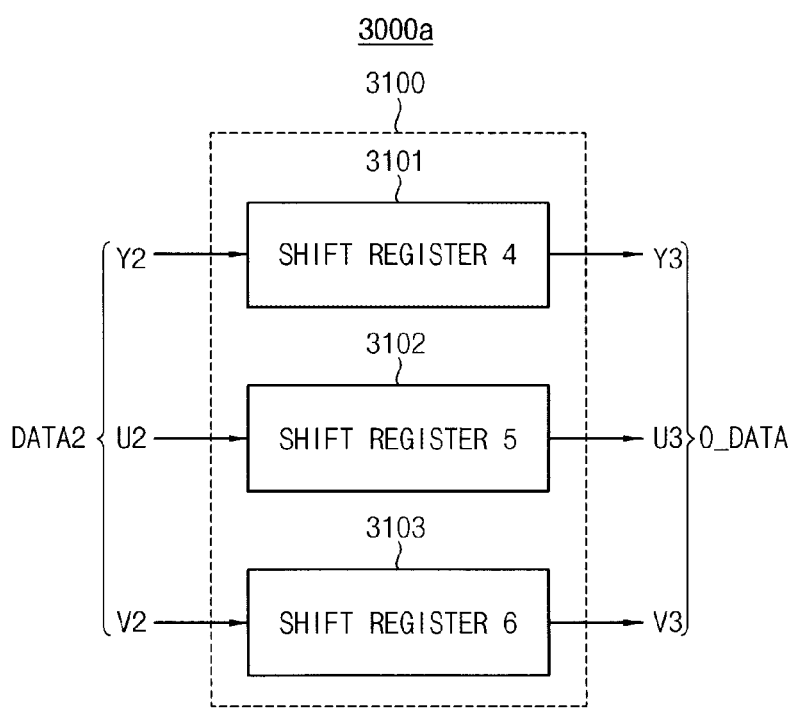
FIG. 6 is a block diagram illustrating a color resolution contraction unit included in a deblocking filter of FIG. 1 according to an exemplary embodiment.

FIG. 6 is a block diagram illustrating a color resolution contraction unit included in a deblocking filter of FIG. 1 according to an exemplary embodiment.

Referring to FIG. 6, a color resolution contraction unit 3000a may include a second shift register unit 3100 that performs a right shift operation on the second video data DATA2. The second shift register unit 3100 may reduce the color resolution of the second video data DATA2 by n bits by shifting the second video data DATA2 to the right by n bits to generate the output video data O_DATA.

The second shift register unit 3100 may include a fourth shift register 3101, a fifth shift register 3102 and a sixth shift register 3103. The fourth shift register 3101 may shift the Y2 signal, which is included in the second video data DATA2, to the right by n bits to generate the Y3 signal. The fifth shift register 3102 may shift the U2 signal, which is included in the second video data DATA2, to the right by n bits to generate the U3 signal. The sixth shift register 3103 may shift the V2 signal, which is included in the second video data DATA2, to the right by n bits to generate the V3 signal.

Therefore, the color resolution contraction unit 3000a may contract each of the color resolutions of the Y2 signal, the U2 signal and the V2 signal, which are included in the second video data DATA2, by n bits to generate the Y3 signal, the U3 signal and the V3 signal, respectively. The color resolution contraction unit 3000a may output the output video data O_DATA that includes the Y3 signal, the U3 signal and the V3 signal.

Figure 7:
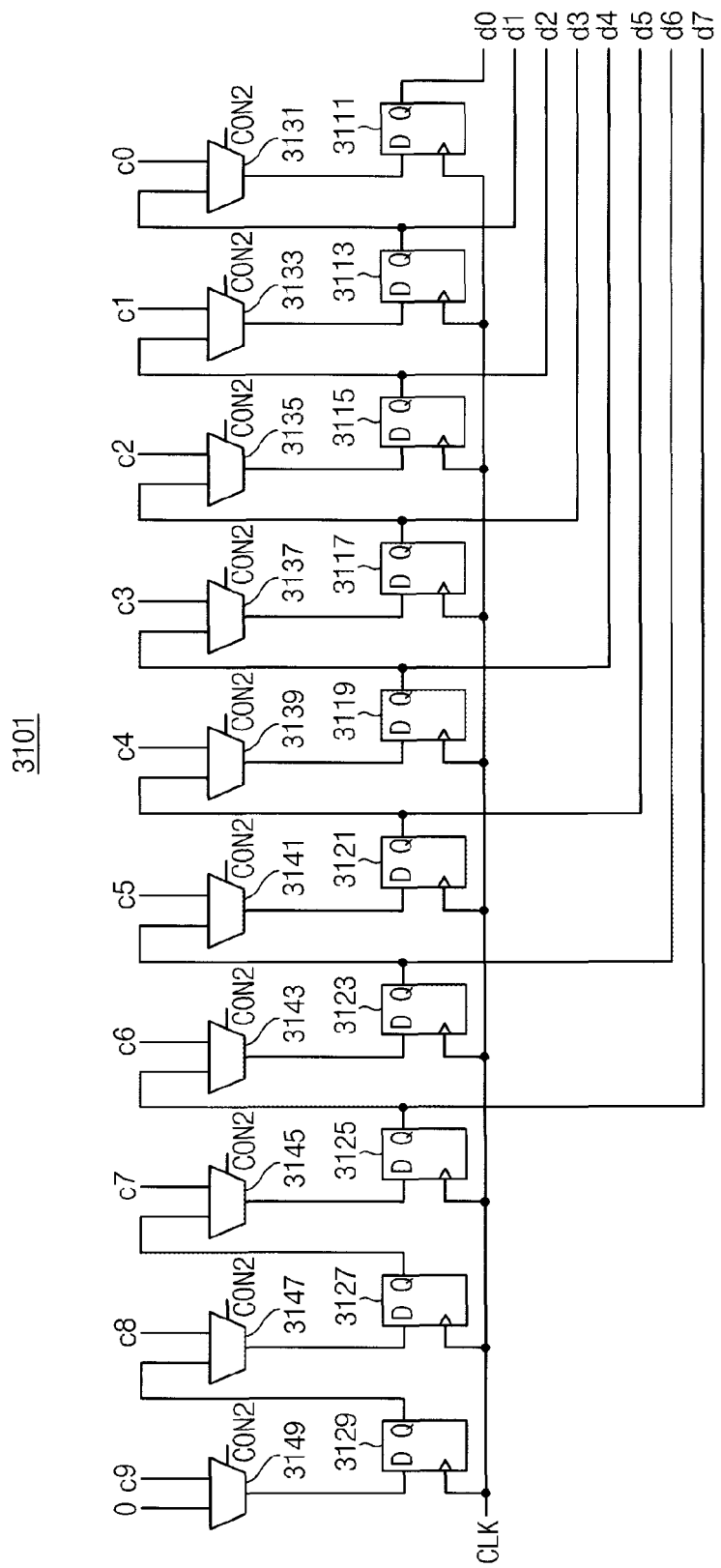
FIG. 7 is a circuit illustrating a fourth shift register included in a color resolution contraction unit of FIG. 6 according to an exemplary embodiment.

FIG. 7 is a circuit illustrating a fourth shift register included in a color resolution contraction unit of FIG. 6 according to an exemplary embodiment.

In FIG. 7, a fourth shift register 3101, which receives the Y2 signal having a color resolution of 10 bits and shifts the Y2 signal to the right by 2 bits to generate the Y3 signal having a color resolution of 8 bits, is illustrated as an example.

In FIG. 7, c9, c8, c7, c6, c5, c4, c3, c2, c1, c0 represents the Y2 signal having a color resolution of 10 bits and d7, d6, d5, d4, d3, d2, d1, d0 represents the Y3 signal having a color resolution of 8 bits. A LSB of the Y2 signal is c0 and a MSB of the Y2 signal is c9. A LSB of the Y3 signal is d0 and a MSB of the Y3 signal is d7.

Referring to FIG. 7, the fourth shift register 3101 may include a first flip-flop 3111, a second flip-flop 3113, a third flip-flop 3115, a fourth flip-flop 3117, a fifth flip-flop 3119, a sixth flip-flop 3121, a seventh flip-flop 3123, an eighth flip-flop 3125, a ninth flip-flop 3127, a tenth flip-flop 3129, a first multiplexer 3131, a second multiplexer 3133, a third multiplexer 3135, a fourth multiplexer 3137, a fifth multiplexer 3139, a sixth multiplexer 3141, a seventh multiplexer 3143, an eighth multiplexer 3145, a ninth multiplexer 3147 and a tenth multiplexer 3149.

Each of the first to the tenth flip-flops 3111, 3113, 3115, 3117, 3119, 3121, 3123, 3125, 3127, 3129 may operate in synchronization with a clock signal CLK received from an external source. Each of the first to the tenth multiplexers 3131, 3133, 3135, 3137, 3139, 3141, 3143, 3145, 3147, 3149 may output one of a signal received at a first input electrode and a signal received at a second input electrode in response to a second control signal CON2. For example, each of the first to the tenth multiplexers 3131, 3133, 3135, 3137, 3139, 3141, 3143, 3145, 3147, 3149 may output a signal received at the first input electrode when the second control signal CON2 has a first value, and output a signal received at the second input electrode when the second control signal CON2 has a second value.

As illustrated in FIG. 7, bits of the Y2 signal, that is, c0, c1, c2, c3, c4, c5, c6, c7, c8 and c9 may be input to the first input electrodes of the first to the tenth multiplexers 3131, 3133, 3135, 3137, 3139, 3141, 3143, 3145, 3147, 3149, respectively. An output electrode Q of the second flip-flop 3113 may be connected to the second input electrode of the first multiplexer 3131. An output electrode Q of the third flip-flop 3115 may be connected to the second input electrode of the second multiplexer 3133. An output electrode Q of the fourth flip-flop 3117 may be connected to the second input electrode of the third multiplexer 3135. An output electrode Q of the fifth flip-flop 3119 may be connected to the second input electrode of the fourth multiplexer 3137. An output electrode Q of the sixth flip-flop 3121 may be connected to the second input electrode of the fifth multiplexer 3139. An output electrode Q of the seventh flip-flop 3123 may be connected to the second input electrode of the sixth multiplexer 3141. An output electrode Q of the eighth flip-flop 3125 may be connected to the second input electrode of the seventh multiplexer 3143. An output electrode Q of the ninth flip-flop 3127 may be connected to the second input electrode of the eighth multiplexer 3145. An output electrode Q of the tenth flip-flop 3129 may be connected to the second input electrode of the ninth multiplexer 3147. The second input electrode of the tenth multiplexer 3149 may receive 0.

An output electrode of the first multiplexer 3131 may be connected to an input electrode D of the first flip-flop 3111. An output electrode of the second multiplexer 3133 may be connected to an input electrode D of the second flip-flop 3113. An output electrode of the third multiplexer 3135 may be connected to an input electrode D of the third flip-flop 3115. An output electrode of the fourth multiplexer 3137 may be connected to an input electrode D of the fourth flip-flop 3117. An output electrode of the fifth multiplexer 3139 may be connected to an input electrode D of the fifth flip-flop 3119. An output electrode of the sixth multiplexer 3141 may be connected to an input electrode D of the sixth flip-flop 3121. An output electrode of the seventh multiplexer 3143 may be connected to an input electrode D of the seventh flip-flop 3123. An output electrode of the eighth multiplexer 3145 may be connected to an input electrode D of the eighth flip-flop 3125. An output electrode of the ninth multiplexer 3147 may be connected to an input electrode D of the ninth flip-flop 3127. An output electrode of the tenth multiplexer 3149 may be connected to an input electrode D of the tenth flip-flop 3129.

Output signals output from the output electrodes Q of the first to the eighth flip-flop 3111, 3113, 3115, 3117, 3119, 3121, 3123, 3125 may be bits of the Y3 signal, that is, d0, d1, d2, d3, d4, d5, d6 and d7, respectively.

Hereinafter, an operation of the fourth shift register 3101 will be described.

Bits of the Y2 signal, that is, c0, c1, c2, c3, c4, c5, c6, c7, c8 and c9 may be input to the first input electrodes of the first to the tenth multiplexers 3131, 3133, 3135, 3137, 3139, 3141, 3143, 3145, 3147, 3149, respectively, while the second control signal CON2 has the first value. Therefore, the first to the tenth multiplexers 3131, 3133, 3135, 3137, 3139, 3141, 3143, 3145, 3147, 3149 may provide c0, c1, c2, c3, c4, c5, c6, c7, c8 and c9, to the input electrodes D of the first to the tenth flip-flops 3111, 3113, 3115, 3117, 3119, 3121, 3123, 3125, 3127, 3129, respectively.

After that, the first to the tenth flip-flops 3111, 3113, 3115, 3117, 3119, 3121, 3123, 3125, 3127, 3129 may output c0, c1, c2, c3, c4, c5, c6, c7, c8 and c9, respectively, in synchronization with the clock signal CLK. Therefore, c1, c2, c3, c4, c5, c6, c7, c8 and c9 may be input to the second input electrodes of the first to the ninth multiplexers 3131, 3133, 3135, 3137, 3139, 3141, 3143, 3145, 3147, respectively.

After that, the second control signal CON2 may transit to the second value. Therefore, the first to the ninth multiplexers 3131, 3133, 3135, 3137, 3139, 3141, 3143, 3145, 3147 may output c1, c2, c3, c4, c5, c6, c7, c8 and c9, respectively, which are input to from the second input electrode, and the tenth multiplexer 3149 may output 0, which is input to the second input electrode.

The fourth shift register 3101 may operate as described above at every cycle of the clock signal CLK. Therefore, after two more cycles of the clock signal CLK, the first to the eighth flip-flops 3111, 3113, 3115, 3117, 3119, 3121, 3123, 3125 may output c2, c3, c4, c5, c6, c7, c8 and c9, respectively, and the ninth flip-flop 3127 and the tenth flip-flop 3129 may output 0. The output signals of the first to the eighth flip-flops 3111, 3113, 3115, 3117, 3119, 3121, 3123, 3125 at this time may be bits of the Y3 signal, that is, d0, d1, d2, d3, d4, d5, d6 and d7, respectively.

Therefore, the fourth shift register 3101 may shift the Y2 signal, which has the color resolution of 10 bits, to the right by 2 bits to generate the Y3 signal, which has the color resolution of 8 bits.

In FIG. 7, 0 is input to the second input electrode of the tenth multiplexer 3149. However, any value other than 0 may be input to the second input electrode of the tenth multiplexer 3149 since output signals of the ninth flip-flop 3127 and the tenth flip-flop 3129 are not used as a bit of the Y3 signal.

The fifth shift register 3102 and the sixth shift register 3103 included in the second shift register unit 3100 of FIG. 6 may have the same structure as the fourth shift register 3101 of FIG. 7. Therefore, a detail description of the fifth shift register 3102 and the sixth shift register 3103 will be omitted.

Figure 8:
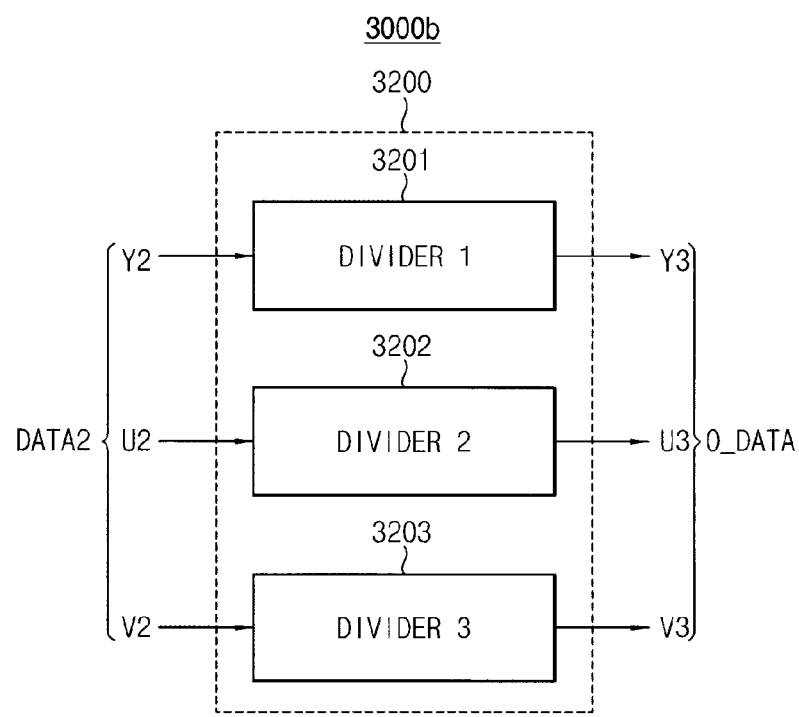
FIG. 8 is a block diagram illustrating a color resolution contraction unit included in a deblocking filter of FIG. 1 according to another exemplary embodiment.

FIG. 8 is a block diagram illustrating a color resolution contraction unit included in a deblocking filter of FIG. 1 according to another exemplary embodiment.

Referring to FIG. 8, a color resolution contraction unit 3000b may include a division unit 3200 that divides the second video data DATA2 by $2^n$. The division unit 3200 may reduce the color resolution of the second video data DATA2 by n bits by dividing the second video data DATA2 by $2^n$ to generate the output video data O_DATA.

The division unit 3200 may include a first divider 3201, a second divider 3202 and a third divider 3203. The first divider 3201 may divide the Y2 signal, which is included in the second video data DATA2, by $2^n$ to generate the Y3 signal. The second divider 3202 may divide the U2 signal, which is included in the second video data DATA2, by $2^n$ to generate the U3 signal. The third divider 3203 may divide the V2 signal, which is included in the second video data DATA2, by $2^n$ to generate the V3 signal.

Therefore, the color resolution contraction unit 3000b may reduce each of the color resolutions of the Y2 signal, the U2 signal and the V2 signal, which are included in the second video data DATA2, by n bits to generate the Y3 signal, the U3 signal and the V3 signal, respectively. The color resolution contraction unit 3000b may output the output video data O_DATA that includes the Y3 signal, the U3 signal and the V3 signal.

Figure 9:
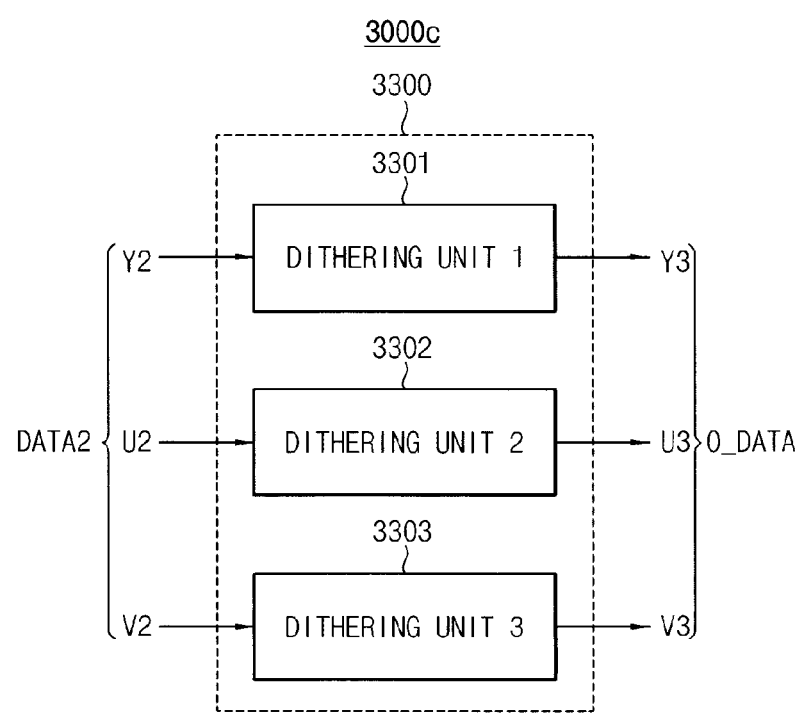
FIG. 9 is a block diagram illustrating still another example of a color resolution contraction unit included in a deblocking filter of FIG. 1 according to still another exemplary embodiment.

FIG. 9 is a block diagram illustrating a color resolution contraction unit included in a deblocking filter of FIG. 1 according to another exemplary embodiment.

Referring to FIG. 9, a color resolution contraction unit 3000c may include a dithering unit 3300 that performs a dithering operation on the second video data DATA2. The dithering unit 3300 may reduce the color resolution of the second video data DATA2, which has the color resolution of (m+n) bits, by n bits by performing a dithering operation on the second video data DATA2 to generate the output video data O_DATA, which has the color resolution of m bits.

The dithering unit 3300 may include a first dithering unit 3301, a second dithering unit 3302 and a third dithering unit 3303. The first dithering unit 3301 may perform a dithering operation on the Y2 signal, which is included in the second video data DATA2, to generate the Y3 signal. The second dithering unit 3302 may perform a dithering operation on the U2 signal, which is included in the second video data DATA2, to generate the U3 signal. The third dithering unit 3303 may perform a dithering operation on the V2 signal, which is included in the second video data DATA2, to generate the V3 signal.

Therefore, the color resolution contraction unit 3000c may reduce each of the color resolutions of the Y2 signal, the U2 signal and the V2 signal, which are included in the second video data DATA2, by n bits to generate the Y3 signal, the U3 signal and the V3 signal, respectively. The color resolution contraction unit 3000c may output the output video data O_DATA that includes the Y3 signal, the U3 signal and the V3 signal.

Figure 10:
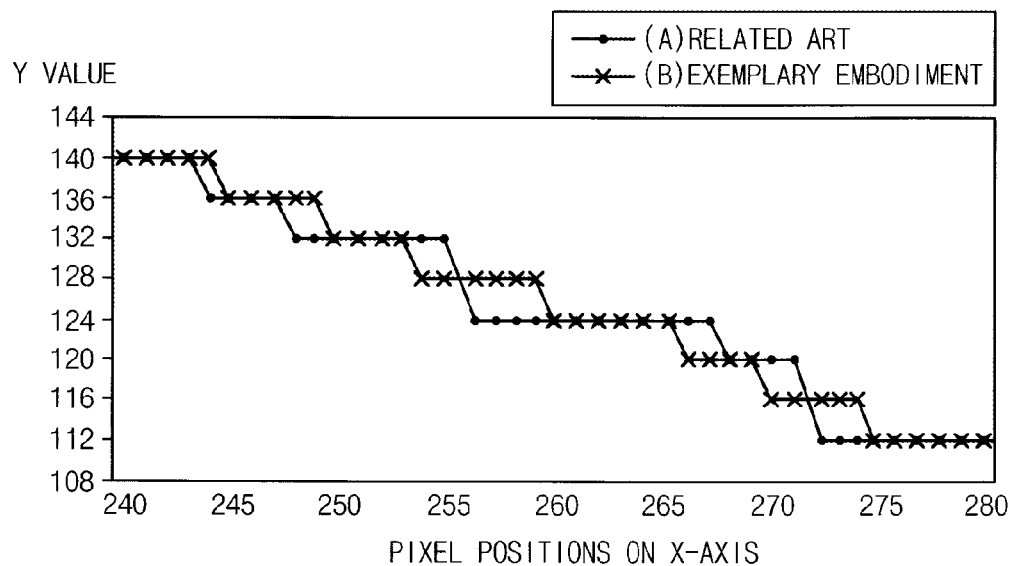
FIG. 10 is a graph for describing an effect of a deblocking filter according to an exemplary embodiment.

FIG. 10 is a graph for describing an effect of a deblocking filter according to an exemplary embodiment.

In FIG. 10, a first graph A represents a value of a luminance signal Y VALUE according to pixel positions on x-axis when a related art deblocking filter is used, and a second graph B represents a value of a luminance signal Y VALUE according to pixel positions on x-axis when the deblocking filter 100 is used.

Referring to FIG. 10, in the case of the related art deblocking filter, a change of the value of the luminance signal Y VALUE is not natural and abrupt changes occurs in the first graph A. On the other hand, in the case of the deblocking filter 100 according to exemplary embodiments, a change of the value of the luminance signal Y VALUE is natural and abrupt changes do not occur in the second graph B. As described above, the deblocking filter 100 performs a blurring operation on a block edge of a video data after a color resolution of the video data is increased, so that the deblocking filter 100 may smooth out an abrupt change of pixel data more naturally. Therefore, the deblocking filter 100 may efficiently reduce a blocking artifact and a color banding in the video data.

Figure 11:
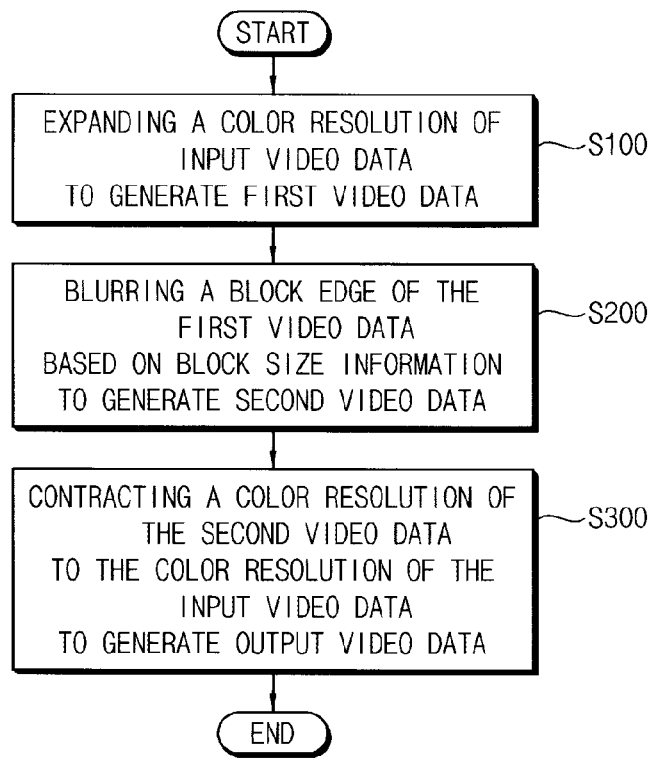
FIG. 11 is a flow chart illustrating a method of deblocking filtering according to an exemplary embodiment.

FIG. 11 is a flow chart illustrating a method of deblocking filtering according to exemplary embodiments.

Referring to FIG. 11, a color resolution of input video data, which is received from an external source, is increased to generate first video data (operation S100). The input video data may be data that is generated by decoding compressed video data, which is compressed by standardized video codecs, such as H.264/AVC, MPEG-4, etc.

A block edge of the first video data is blurred based on block size information to generate second video data (operation S200). A color resolution of the second video data may be the same as the color resolution of the first video data. According to standardized video codecs, such as H.264/AVC, MPEG-4, etc., video data is compressed in block units. The block size information may represent a size of a block unit of the compressed video data. In some exemplary embodiments, the block size information may be 4×4. In other exemplary embodiments, the block size information may be 8×8.

The color resolution of the second video data is reduced to the color resolution of the input video data to generate output video data (operation S300).

In the standardized video codecs, such as H.264/AVC, MPEG-4, etc., a video data is compressed in block units and then decoded, which may result in a blocking artifact and a color banding in decoded video data. In the method of deblocking filtering according to exemplary embodiments, a block edge of a video data is blurred after a color resolution of the video data is increased, so that an abrupt change of pixel data is smoothed out more naturally. Therefore, the method of deblocking filtering may efficiently reduce a blocking artifact and a color banding in the video data.

Figure 12:
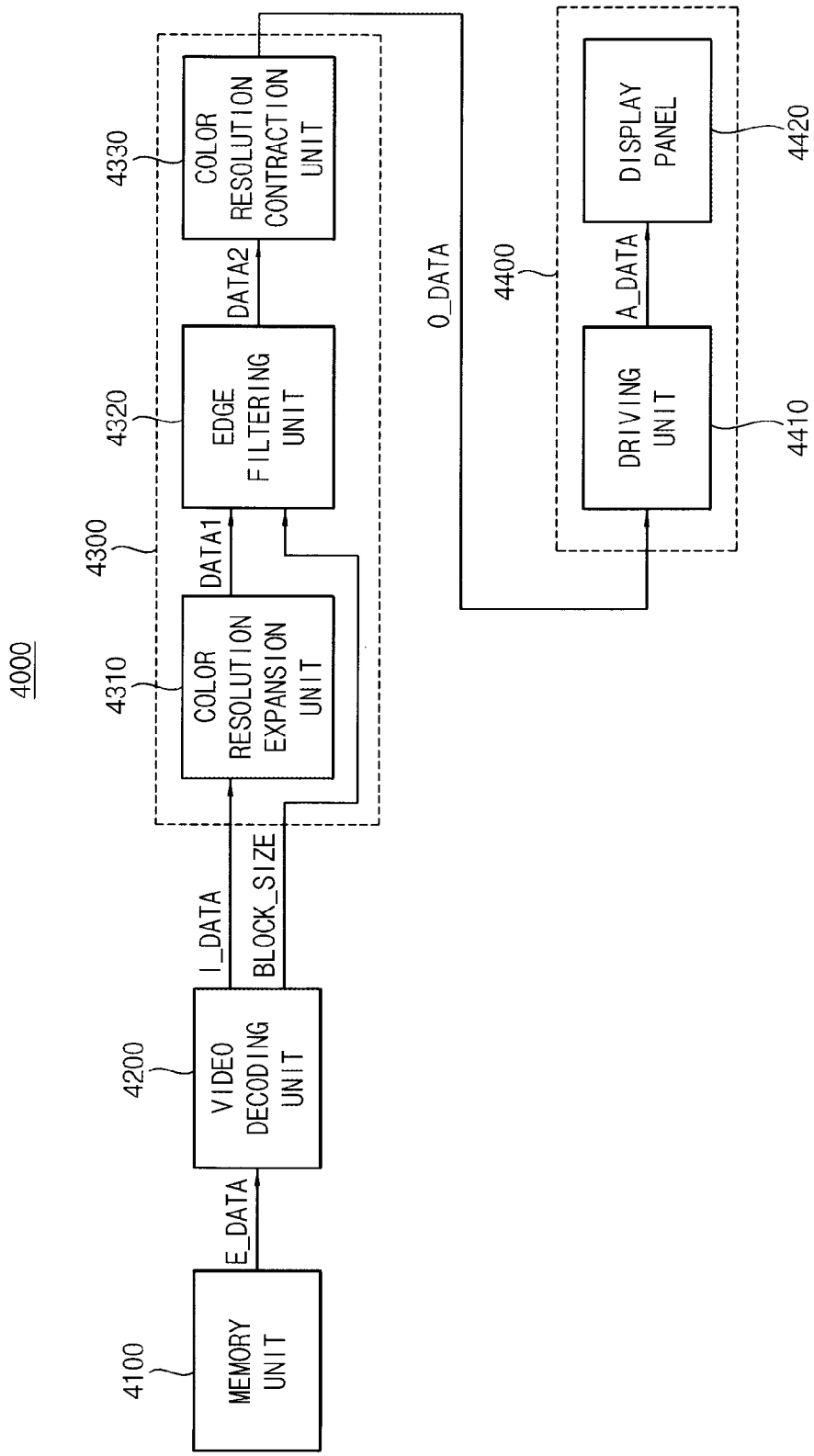
FIG. 12 is a block diagram illustrating a display device according to an exemplary embodiment.

FIG. 12 is a block diagram illustrating a display device according to an exemplary embodiment.

Referring to FIG. 12, a display device 4000 includes a video decoding unit 4200, a deblocking filter 4300 and a display unit 4400.

The video decoding unit 4200 decodes compressed video data E_DATA, which is compressed by standardized video codecs, such as H.264/AVC, MPEG-4, etc, to generate input video data I_DATA and outputs block size information BLOCK_SIZE, which represents a size of a block unit of the compressed video data E_DATA.

The display device 4000 may further include a memory unit 4100. The memory unit 4100 may store the compressed video data E_DATA. The memory unit 4100 may include any type of non-volatile memory devices, such as a flash memory, a solid state drive (SSD), a hard disk drive (HDD), etc.

The deblocking filter 4300 filters the input video data I_DATA based on the block size information BLOCK_SIZE to generate output video data O_DATA.

The deblocking filter 4300 includes a color resolution expansion unit 4310, an edge filtering unit 4320 and a color resolution contraction unit 4330.

The color resolution expansion unit 4310 increases a color resolution of the input video data I_DATA to generate first video data DATA1.

The edge filtering unit 4320 performs a blurring operation on a block edge of the first video data DATA1 based on the block size information BLOCK_SIZE to generate second video data DATA2.

The color resolution contraction unit 4330 reduces a color resolution of the second video data DATA2 to the color resolution of the input video data I_DATA to generate the output video data O_DATA.

The color resolution expansion unit 4310, the edge filtering unit 4320 and the color resolution contraction unit 4330 of FIG. 12 may have the same structure as the color resolution expansion unit 1000, the edge filtering unit 2000 and the color resolution contraction unit 3000 of FIG. 1. The structure and operation of the color resolution expansion unit 1000, the edge filtering unit 2000 and the color resolution contraction unit 3000 are described above with reference to FIGS. 1 to 10. Therefore, a detail description of the color resolution expansion unit 4310, the edge filtering unit 4320 and the color resolution contraction unit 4330 will be omitted.

The display unit 4400 displays the output video data O_DATA. The display unit 4400 may include a driving unit 4410 and a display panel 4420.

The driving unit 4410 may generate analog video data A_DATA based on the output video data O_DATA received from the deblocking filter 4300.

The display panel 4420 may display the analog video data A_DATA. The display panel 4420 may include a liquid crystal display (LCD) panel, an organic light emitting display (OLED) panel, a plasma display panel (PDP), etc.

The display device 4000 of FIG. 12 may be any device that has a function to display a compressed video data.

The foregoing is illustrative of the present inventive concept and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various exemplary embodiments and is not to be construed as limited to the specific exemplary embodiments disclosed, and that modifications to the disclosed exemplary embodiments, as well as other exemplary embodiments, are intended to be included within the scope of the appended claims.

What is claimed is:

1. A deblocking filter comprising:
    a color resolution expansion unit configured to increase a color resolution of input video data to generate first video data;
    an edge filtering unit configured to perform a blurring operation on a block edge of the first video data based on block size information to generate second video data; and
    a color resolution contraction unit configured to reduce a color resolution of the second video data to generate output video data,
    wherein a color resolution of the output video data is the same as a color resolution of the input video data.

2. The deblocking filter of claim 1, wherein the color resolution expansion unit comprises a shift register unit that performs a left shift operation on the input video data.

3. The deblocking filter of claim 1, wherein the color resolution expansion unit comprises a multiplication unit that multiplies the input video data by $2^n$, where n is a positive integer.

4. The deblocking filter of claim 1, wherein the color resolution contraction unit comprises a shift register unit that performs a right shift operation on the second video data.

5. The deblocking filter of claim 1, wherein the color resolution contraction unit comprises a division unit that divides the second video data by $2^n$, where n is a positive integer.

6. The deblocking filter of claim 1, wherein the color resolution contraction unit comprises a dithering unit that performs a dithering operation on the second video data.

7. The deblocking filter of claim 1, wherein the input video data comprises a Y signal, a U signal and a V signal, the Y signal represents a luminance of the input video data, the U signal and the V signal represent a chrominance of the input video data, and each of color resolutions of the Y signal, the U signal and the V signal is m bits, and
wherein the color resolution expansion unit increases each of the color resolutions of the Y signal, the U signal and the V signal to (m+n) bits to generate a first Y signal, a first U signal and a first V signal, respectively, the first video data includes the first Y1 signal, the first U1 signal and the first V1 signal, and n and m are positive integers.

8. The deblocking filter of claim 7, wherein the color resolution expansion unit comprises:
a first shift register configured to shift the Y signal to the left by n bits to generate the first Y signal;
a second shift register configured to shift the U signal to the left by n bits to generate the first U signal; and
a third shift register configured to shift the V signal to the left by n bits to generate the first V signal.

9. The deblocking filter of claim 7, wherein the color resolution expansion unit comprises:
a first multiplier configured to multiply the Y signal by $2^n$ to generate the first Y signal;
a second multiplier configured to multiply the U signal by $2^n$ to generate the first U signal; and
a third multiplier configured to multiply the V signal by $2^n$ to generate the first V signal.

10. The deblocking filter of claim 7, wherein the edge filtering unit performs a blurring operation on block edges of the first Y signal, the first U signal and the first V signal to generate a second Y signal, a second U signal and a second V signal, respectively, and the second video data includes the second Y signal, the second U signal and the second V signal.

11. The deblocking filter of claim 10, wherein the color resolution contraction unit reduces each of color resolutions of the second Y signal, the second U signal and the second V signal to m bits to generate a third Y signal, a third U signal and a third V signal, respectively, and the output video data includes the third Y signal, the third U signal and the third V signal.

12. The deblocking filter of claim 11, wherein the color resolution contraction unit comprises:
a first shift register configured to shift the second Y signal to the right by n bits to generate the third Y signal;
a second shift register configured to shift the second U signal to the right by n bits to generate the third U signal; and
a third shift register configured to shift the second V signal to the right by n bits to generate the third V signal.

13. The deblocking filter of claim 11, wherein the color resolution contraction unit comprises:
a first divider configured to divide the second Y signal by $2^n$ to generate the third Y signal;
a second divider configured to divide the second U signal by $2^n$ to generate the third U signal; and
a third divider configured to divide the second V signal by $2^n$ to generate the third V signal.

14. The deblocking filter of claim 11, wherein the color resolution contraction unit comprises:
a first dithering unit configured to perform a dithering operation on the second Y signal to generate the third Y signal;
a second dithering unit configured to perform a dithering operation on the second U signal to generate the third U signal; and
a third dithering unit configured to perform a dithering operation on the second V signal to generate the third V signal.

15. A display device comprising:
a video decoding unit configured to decode compressed video data to generate input video data and configured to output block size information representing a size of a block unit of the compressed video data;
a deblocking filter configured to filter the input video data based on the block size information to generate output video data; and
a display unit configured to display the output video data, wherein the deblocking filter comprises:
a color resolution expansion unit configured to increase a color resolution of the input video data to generate first video data;
an edge filtering unit configured to perform a blurring operation on a block edge of the first video data based on the block size information to generate second video data; and
a color resolution contraction unit configured to reduce a color resolution of the second video data to generate the output video data, wherein a color resolution of the output video data is the same as a color resolution of the input video data.

16. A deblocking filter method comprising:
increasing a color resolution of input video data to generate first video data;
performing a blurring operation on a block edge of the first video data based on block size information to generate second video data; and
reducing a color resolution of the second video data to generate output video data, wherein a color resolution of the output video data is the same as a color resolution of the input video data.

17. The deblocking filter method of claim 16, wherein the increasing the color resolution of the input video data comprises performing a left shift operation on the input video data.

18. The deblocking filter method of claim 16, wherein the reducing the color resolution of the second video data comprises performing a right shift operation on the second video data.

19. The deblocking filter method of claim 17, wherein the increasing the color resolution of the input video data comprises multiplying the input video data by $2^n$, where n is a positive integer.

20. The deblocking filter method of claim 19, wherein the reducing the color resolution of the second video data comprises dividing the second video data by $2^n$.

* * * * *